United States Patent
Ozawa

(10) Patent No.: US 7,333,151 B2
(45) Date of Patent: Feb. 19, 2008

(54) DOT CLOCK SYNCHRONIZATION GENERATOR CIRCUIT

(75) Inventor: Kazumasa Ozawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 533 days.

(21) Appl. No.: 11/049,327

(22) Filed: Feb. 3, 2005

(65) Prior Publication Data
US 2005/0264696 A1 Dec. 1, 2005

(30) Foreign Application Priority Data
May 28, 2004 (JP) ............................ 2004-159736

(51) Int. Cl.
*H04N 5/06* (2006.01)

(52) U.S. Cl. ..................................... 348/537

(58) Field of Classification Search ................ 348/537, 348/536, 541, 500, 544, 545, 546, 538, 571, 348/914; 345/213
See application file for complete search history.

(56) References Cited

U.S. PATENT DOCUMENTS 5,479,073 A * 12/1995 Mamiya et al. .......... 315/169.3
5,940,136 A * 8/1999 Abe et al. ................... 348/537
6,304,296 B1 * 10/2001 Yoneno ....................... 348/537
6,731,343 B2 * 5/2004 Yoneno ....................... 348/537
6,924,796 B1 * 8/2005 Someya et al. ............. 345/213

FOREIGN PATENT DOCUMENTS

| JP | 06-102835 | 4/1994 |
| JP | 10-026953 | 1/1998 |
| JP | 10-133619 | 5/1998 |

* cited by examiner

*Primary Examiner*—Paulos M. Natnael
(74) *Attorney, Agent, or Firm*—Nixon Peabody LLP; Donald R. Studebaker

(57) ABSTRACT

A circuit which generates a dot clock synchronized to an external video signal which can ensure a pulse width allowed by a device which is supplied with the dot clock. A high frequency clock is divided to generate a first dot clock, and the phase is initialized in accordance with information on a previously set frequency division ratio upon detection of a significant edge of a horizontal synchronization signal. Also, a second dot clock, the logical level of which changes every minimum allowable period, is formed from the high frequency clock in accordance with information on a previously set minimum allowable period, and the phase is modified upon detection of the significant edge such that the minimum allowable period is ensured for the logical level period even before and after the detection. The second dot clock is selected upon detection of the significant edge, and afterwards, the first dot clock is selected when a confirmation can be made that the timing of the first dot clock is coincident with or behind the timing of the second dot clock.

10 Claims, 11 Drawing Sheets

DOT CLOCK SYNCHRONIZATION GENERATOR CIRCUIT

BACKGROUND OF THE INVENTION

1. Field of the Invention

The present invention relates to a dot clock synchronization generator circuit which can be applied, for example, to LSIs (integrated circuits) for processing video signals.

2. Description of the Related Art

Some LSI for processing video signals generates a video clock synchronized with an external video clock within the LSI. Such an LSI is not applied with an external video clock but is applied only with external video signal and horizontal synchronization signal (EXHSYNC) to generate a clock having the same frequency and phase as the external video clock based on an oscillation clock at a higher frequency than the video clock applied from the outside (hereinafter called the "high frequency clock") and the horizontal synchronization signal, such that external video signals are processed by this internally generated clock. The internally generated clock is used for processing external video signals instead of the external video clock because of such advantages as the ability to execute part of video processing in accordance with the high frequency clock, and elimination of wiring for supplying the video clock to the LSI.

In the generation of the video clock (hereinafter called the "dot clock" which particularly refers to an internally generated clock), for matching the frequency between the dot clock and the external video clock, a frequency division ratio from the high frequency clock to the dot clock may be previously set by a register or the like. Also, as mentioned above, the horizontal synchronization signal EXHSYNC is applied from the outside for matching the phase of the dot clock with the phase of the external video clock. Within the LSI, the applied external horizontal synchronization signal EXHSYNC is also handled as a horizontal synchronization signal HSYNC as it is.

A video processing system which includes an LSI as described above must maintain a relationship between the number of rising edges (or the number of falling edges) of the external video clock generated after the external horizontal synchronization signal EXHSYNC falls and the number of rising edges (or the number of falling edges) of the dot clock generated inside after the horizontal synchronization signal HSYNC falls, as shown in FIG. 2. This is because the number of rising edges represents the positions of pixels on an associated horizontal line in the horizontal direction, and the number of pixels on a horizontal line and the order of pixels from the left end of the horizontal line are counted within a video processing circuit contained in the LSI.

The dot clock, though generated to have the same frequency and the same phase as the external video clock, is a self-running clock generated within the LSI, so that it is basically asynchronous to the external video clock. For this reason, the two clocks can shift larger from each other gradually over time unless a synchronization feature is provided. A timing at which the LSI is applied with the external horizontal synchronization signal EXHSYNC synchronized with the external video clock for synchronizing the dot clock to the external video clock is also asynchronous for the LSI. Therefore, when the dot clock is adjusted in phase based on the external horizontal synchronization signal EXHSYNC, a hazard (a clock pulse having a pulse width equal to or smaller than that allowed by the device) can introduce into a dot clock sequence depending on an input timing relationship between the dot clock and the external horizontal synchronization signal EXHSYNC, possibly resulting in a malfunction of a device which receives the dot clock sequence.

Here, a synchronizing method applied to the dot clock must maintain the relationship between the number of rising edges of the dot clock internally generated after the falling of the horizontal synchronization signal HSYNC and the number of rising edges of the external video clock generated after the falling of the external horizontal synchronization signal EXHSYNC.

Therefore, a need exists for a dot clock synchronization generator circuit which is capable of generating a dot clock that is in synchronism with an external video signal which can ensure a pulse width allowed by a device which is supplied with the dot clock (and preferably capable of ensuring a predetermined number of clocks per horizontal scanning line).

SUMMARY OF THE INVENTION

To solve the foregoing problem, the present invention provides a dot clock synchronization generator circuit for generating a dot clock corresponding to each pixel on one horizontal scanning line based on a horizontal synchronization signal applied thereto, and a high frequency signal applied thereto having a frequency higher than the frequency of the dot clock to be generated. The dot clock synchronization generator circuit is characterized by comprising (1) a frequency division ratio storing part for storing information on a frequency division ratio for diving the high frequency clock, (2) a minimum allowable period information storing part for storing information on a minimum allowable period of each logical level period of the DOT clock, defined by the number of cycles of the high frequency clock, (3) an edge detecting part for detecting a significant edge of the horizontal synchronization signal, (4) a first dot clock forming part for dividing the high frequency clock to form a first dot clock in accordance with the information on the frequency division ratio stored in the frequency division ratio storing part, and for initializing the phase of the first dot clock in accordance with the information on the frequency division ratio stored in the frequency division ratio storing part upon detection of the significant edge of the horizontal synchronization signal, (5) a second dot clock forming part for forming a second dot clock which changes a logical level every minimum allowable period from the high frequency clock in accordance with the information on the minimum allowable period stored in the minimum allowable period information storing part, and for modifying the phase of the second dot clock upon detection of the significant edge of the horizontal synchronization signal such that the minimum allowable period of the logical level period is ensured even before and after the detection of the significant edge, (6) a selecting part for selecting one of the first and second dot clocks as a dot clock to be output, and (7) a selection control part for forcing the selecting part to select the second dot clock from the second dot clock forming part upon detection of the significant edge of the horizontal synchronization signal, and for forcing the selecting part to select the first dot clock from the first dot clock forming part when a confirmation can be made that the timing of the significant edge of the first dot clock is coincident with or behind the timing of the significant edge of the second dot clock.

According to the dot clock synchronization generator circuit of the present invention, a dot clock can be generated in synchronism with an external video signal which can ensure a pulse width (minimum allowable period) allowed by a device which is supplied with the dot clock.

DETAILED DESCRIPTION OF THE INVENTION (A) First Embodiment

In the following, a dot clock synchronization generator circuit according to a first embodiment of the present invention will be described in detail with reference to the drawings.

(A-1) Configuration of First Embodiment

Figure 1:
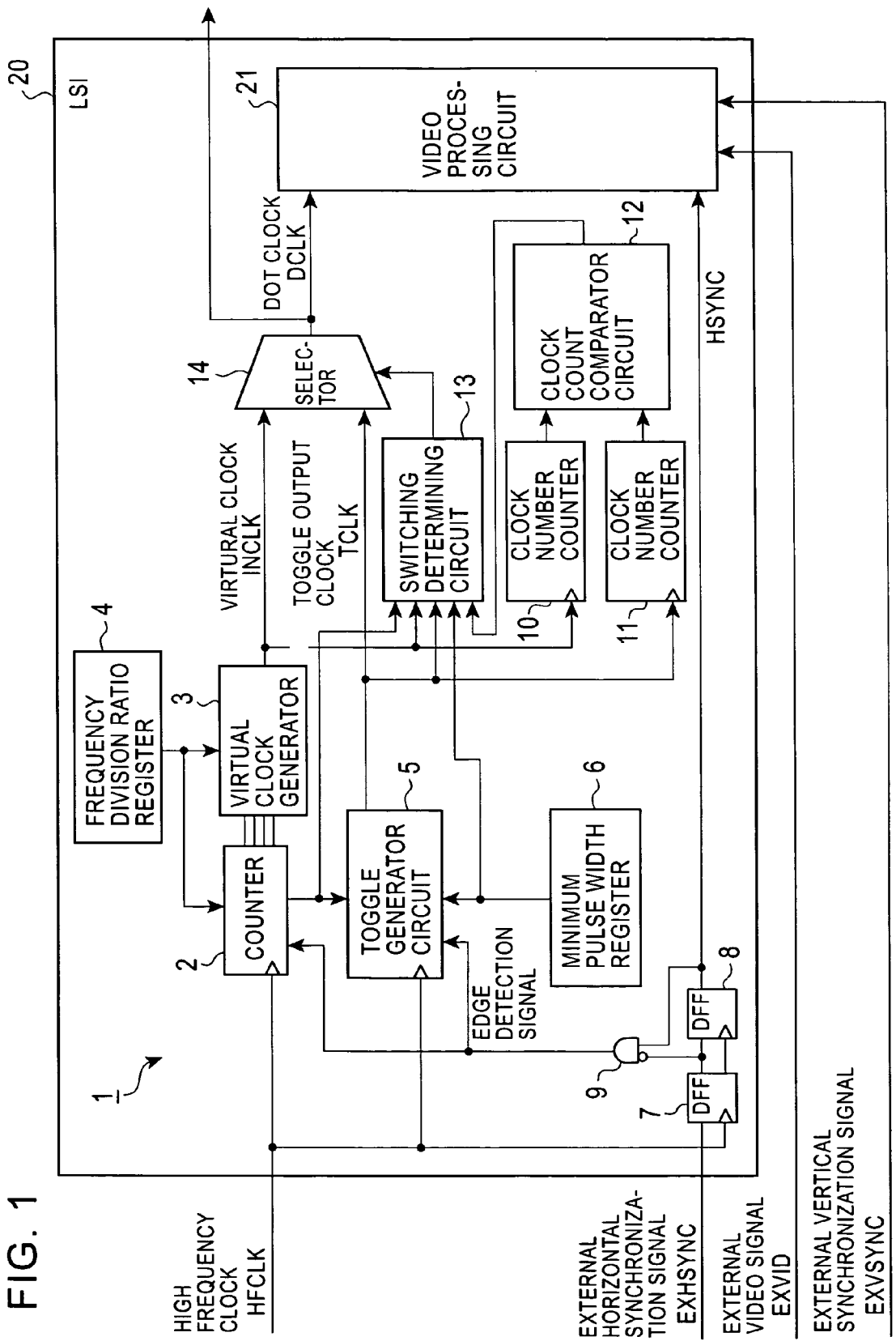
FIG. 1 is a block diagram showing the configuration of a dot clock synchronization generator circuit according to a first embodiment.
Figure 2:
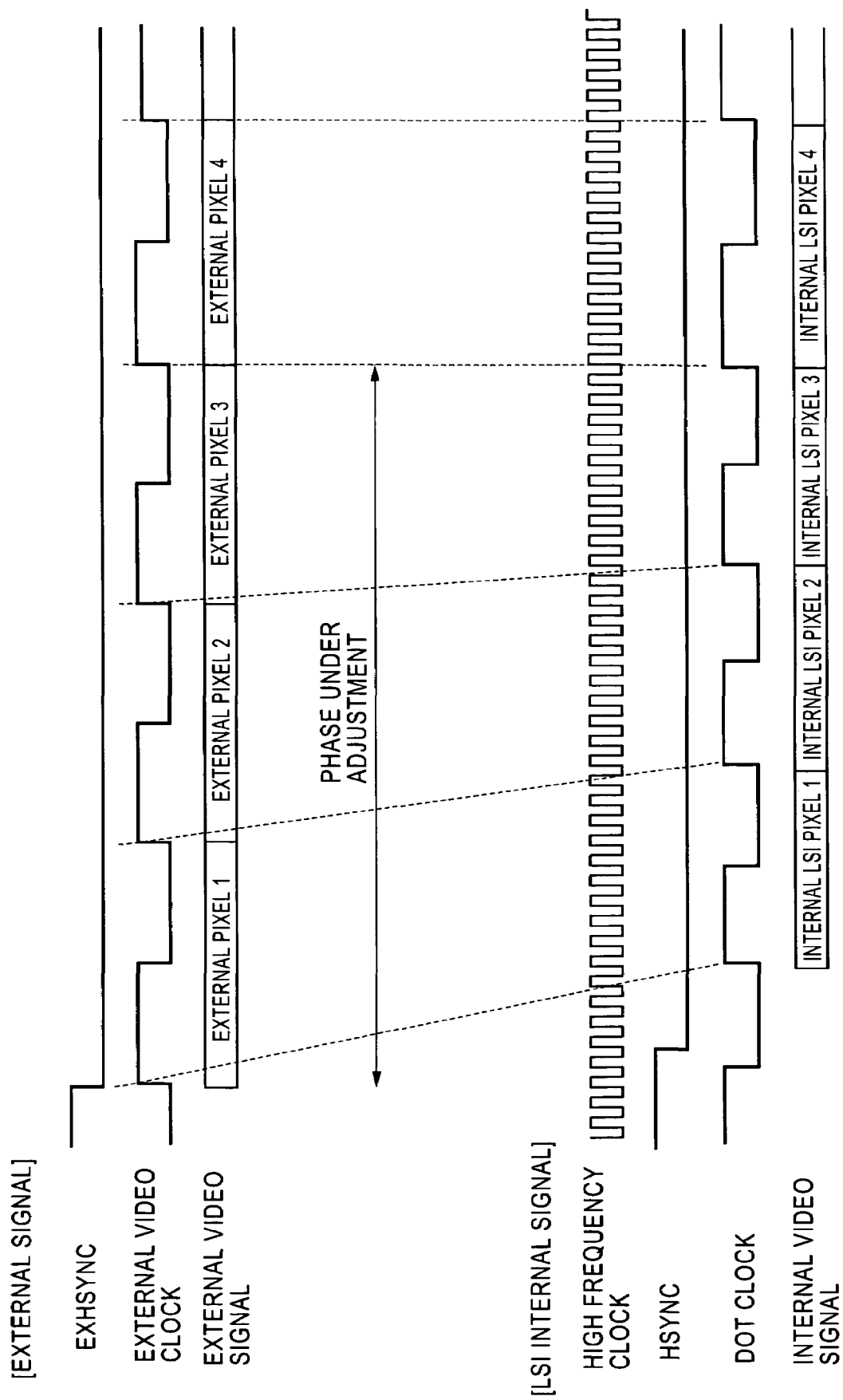
FIG. 2 is a timing chart showing the relationship between an external video clock and an internally generated dot clock.

FIG. 1 is a block diagram showing the configuration of the dot clock synchronization generator circuit according to the first embodiment.

In FIG. 1, the dot clock synchronization generator circuit 1 of the first embodiment is contained in an LSI 20 for processing video signals together with a video processing circuit 21. The dot clock synchronization generator circuit 1 of the first embodiment comprises a counter 2, a virtual clock generator circuit 3, a frequency division ratio register (CLKDIV register) 4, a toggle generator circuit 5, a minimum pulse width register 6, two D-flip-flops 7, 8, an AND gate 9, two clock number counters 10, 11, a clock count comparator circuit 12, a switching determining circuit 13, and a selector 14.

The counter 2 is a counter for counting up with a high frequency clock HFCLK applied from the outside, and is, for example, a 4-bit counter. The number of bits of the counter 2 is arbitrary because it depends on the frequency of a clock which can be used for the dot clock, and the frequency of a high frequency clock which can be applied from the outside as a multiplied clock thereof. While the dot clock synchronization generator circuit 1 of the first embodiment can set the period of a dot clock DCLK generated thereby, the number of bits is determined for the counter 2 in accordance with the longest period which can be set. Stated in a reverse way, the number of bits of the counter 2 defines the longest period within a range of period which can be set for the dot clock DCLK generated thereby.

The counter 2 loads a value determined by the contents of the frequency division ratio register 4 in response to an edge detection signal EG from the AND gate 9, later described. Also, the counter 2 changes its count value within a count value changing range which is determined in accordance with the contents set in the frequency division ratio register 4.

The virtual clock generator circuit 3 outputs a virtual clock INCLK which rises when the count value of the counter 2 is at a first predetermined value, and falls when the count value of the counter 2 is at a second predetermined value. These first and second predetermined values are determined in accordance with the contents set in the frequency division ratio register 4, and are, for example, those values which bring the duty ratio of the virtual clock INCLK to 50%. The virtual clock INCLK from the virtual clock generator circuit 3 is generated by dividing the high frequency clock HFCLK, and is applied to the selector 14 as a first clock candidate.

The frequency division ratio register (CLKDIV register) 4 is loaded with frequency division ratio information for forming the virtual clock INCLK from the high frequency clock HFCLK, and holds the frequency division ratio information. The frequency division ratio information used herein may be, for example, the value of clock periods of the high frequency clock HFCLK which is equal to one clock period of the virtual clock INCLK. For example, the frequency division ration information is "12" for a frequency division ratio which corresponds 12 clock periods of the high frequency clock HFCLK to one clock period of the virtual clock INCLK. Though omitted in FIG. 1, the LSI 20 contains a CPU, and has a command which instructs the CPU to set a value in the frequency division ratio register 4. Upon recognition of the command, the CPU sets the frequency division ratio information included in the command in the frequency division ratio register 4. The minimum pulse width register 6, later described, and registers 15-17 in a second embodiment, later described, are set in a similar manner as well.

As is apparent from the foregoing, the counter 2, virtual clock generator circuit 3, and frequency division ratio register 4 make up a variable frequency divider circuit.

The toggle generator circuit 5 generates and outputs a clock (hereinafter called the "toggle output clock") TCLK from the high frequency clock HFCLK in accordance with minimum pulse width information set in the minimum pulse width register 6, later described, such that the clock TCLK has a duty ratio of 50% and one clock period which is twice the set minimum pulse width. The toggle output clock TCLK is applied to the selector 14 as a second clock candidate for the dot clock DCLK. The toggle generator circuit 5 also adjusts the phase of the toggle output clock TCLK based on the contents of the minimum pulse width register 6, the value of the counter 2, and the like when it is applied with an edge detection signal EG from the AND gate 9, later described.

The minimum pulse width register 6 is loaded with and holds minimum pulse width information for defining a minimum spacing between effective edges before and after the dot clock INCLK. The minimum pulse width information is represented, for example, by the value of clock periods of the high frequency clock HFCLK which corresponds to one-half clock period of the toggle output clock TCLK. For example, the minimum pulse width information is "5" for a minimum pulse width which maps five clock periods of the high frequency clock HFCLK to one-half clock period of the toggle output clock TCLK.

The two D-flip-flops 7, 8, which are connected in cascade, operate as a latch in response to the high frequency clock HFCLK. The D-flip-flops 7, 8 are applied from the horizontal synchronization signal EXHSYNC from the outside, and delay the external horizontal synchronization signal EXHSYNC by two clock periods of the high frequency clock HFCLK to generate a horizontal synchronization signal HSYNC which is applied to the video processing circuit 21.

The AND gate 9 is applied with an inverted version of the latch output of the first-stage D-flip-flop 7, and with the latch output of the second-stage D-flip-flop 8 as it is. The AND gate 9 takes a logical AND of these two inputs to output the aforementioned edge detection signal EG. The edge detection signal EG represents a falling edge of the external horizontal synchronization signal EXHSYNC in accordance with the high frequency clock HFCLK. The edge detection signal changes to a significant level with a delay of one to two clock periods of the high frequency clock HFCLK from a rising edge of the external horizontal synchronization signal EXHSYNC, and therefore takes the significant level only for one high frequency clock period.

From a viewpoint of the detection of a falling edge of the external horizontal synchronization signal EXHSYNC, the D-flip-flops 7, 8 and AND gate 9 make up a differential circuit (edge detector circuit).

The first clock number counter 10 counts the number of the virtual clocks INCLK, for example, at a timing of its rising edge, while the second clock number counter 11 counts the number of the toggle output clocks TCLK, for example, at a timing of its rising edge. The count values of the first and second clock number counters 10, 11 are compared with each other, for example, by the clock count comparator circuit 12.

The switching determining circuit 13 is applied with the value of the counter 2, the contents set in the frequency division ratio register 4, virtual clock INCLK, toggle output clock TCLK, minimum pulse width information, result of the comparison from the clock count comparator circuit 12, and the like. The switching determining circuit 13 forms a selection control signal for the selector 14. While a method of forming the selection control signal will be described in detail in the section of description of the operation, later described, a basic concept of the formation is as follows. Immediately after a transition to a new horizontal scanning line, the selection control signal causes the selector 14 to select a phase adjusted toggle output clock TCLK as the dot clock DCLK, and subsequently select the virtual clock INCLK as the dot clock DCLK from a timing at which the virtual clock INCLK is thought to synchronize to the external video clock DCLK.

The selector 14 selects one of the virtual clock INCLK and toggle output clock TCLK as the dot clock DCLK in accordance with the selection control signal from the switching determining circuit 13. The dot clock DCLK is applied to the video processing circuit 21, and is also output as appropriate to the outside of the LSI 20.

The video processing circuit 21 is applied with a video signal EXVID and a vertical synchronization signal EXVSYNC from the outside in addition to the horizontal synchronization signal HSYNC and dot clock DCLK to execute predetermined video processing. Though not shown, the video signal EXVID, vertical synchronization signal EXVSYNC, and the like are also synchronized to the high frequency clock HFCLK as appropriate.

(A-2) Operation of First Embodiment

Next, description will be made on the operation of the dot clock synchronization generator circuit of the first embodiment. First described is the overall flow of the operation for generating the dot clock DCLK.

The differential circuit made up of the D-flip-flops 7, 8 and AN gate 9 makes the edge detection signal EG significant upon detection of a falling edge of the external horizontal synchronization signal EXHSYNC.

In response, the counter 2 is loaded with a predetermined value, and subsequently performs a count-up operation upon arrival of the high frequency clock HFCLK. The virtual clock generator circuit 3 generates and outputs the virtual clock INCLK, the logic level of which is inverted each time the count value reaches a first or a second predetermined value determined by the contents set in the frequency division ratio register 4.

On the other hand, the toggle output circuit 5 reviews the phase in response to the significant edge detection signal EG, and outputs the toggle output clock TCLK which alternately takes an "H" level period having a minimum pulse width set in the minimum pulse width register 6 and an "L" level which has the minimum pulse width in response to the arrival of the subsequent high frequency clock HFCLK.

Immediately after the edge detection signal EG has become significant, the selector 14 selects the toggle output clock TCLK which is output as the dot clock DCLK, under the control of the switching determining circuit 13. Then, the switching determining circuit 13 sequentially compares the count value of the counter 2, the relationship between the level of the dot clock DCLK and the level of the virtual clock INCLK (whether synchronized or not), and the number of the counted virtual clocks INCLK and toggle output clocks TCLK. At a time the switching determining circuit 13 determines that the toggle output clock TCLK having the minimum pulse width is not needed, the selector 14 is switched to select the virtual clock INCLK for the dot clock DCLK. The concept of switching the selection control signal is as follows.

The switching determining circuit 13 manages the number of times the dot clock DCLK rises from the result of comparison made by the clock count comparator circuit 12 between the numbers of clocks from the counter circuits 10, 11 which count up the virtual clock INCLK and toggle output clock TCKL, respectively, and changes the selection control signal at a timing at which the number of dot clocks (in other words, the number of dots) on one horizontal scanning line can be ensured to reach a predetermined value. In addition, the switching determining circuit 13 changes the selection control signal at a timing at which a pulse shorter than the minimum pulse width (significant level pulse) can be ensured not to be generated even if the dot clock DCLK is switched from the toggle output clock TCLK to the virtual clock INCLK.

As described above, the external video clock and dot clock DCLK are adjusted in phase by replacing with the toggle output clock TCLK having the minimum pulse width until the phase of the virtual clock INCLK generated in accordance with the register setting matches the phase of the external video clock.

Figure 3:
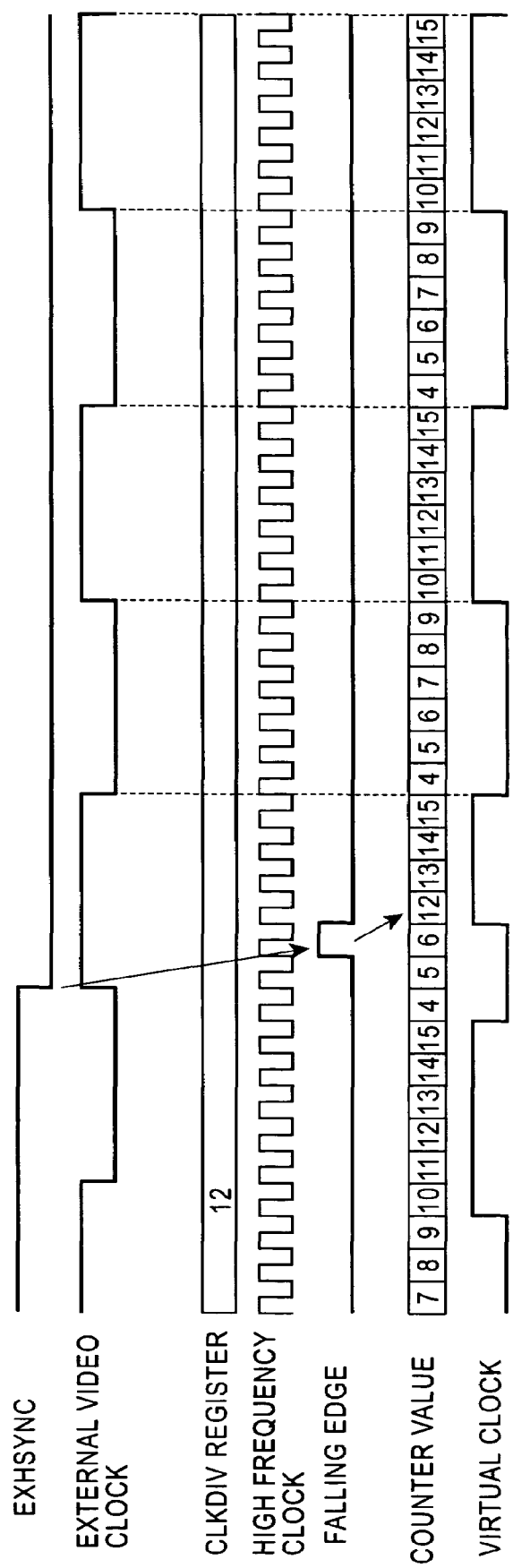
FIG. 3 is a timing chart (1) representing a virtual clock generating operation in the first embodiment.
Figure 4:
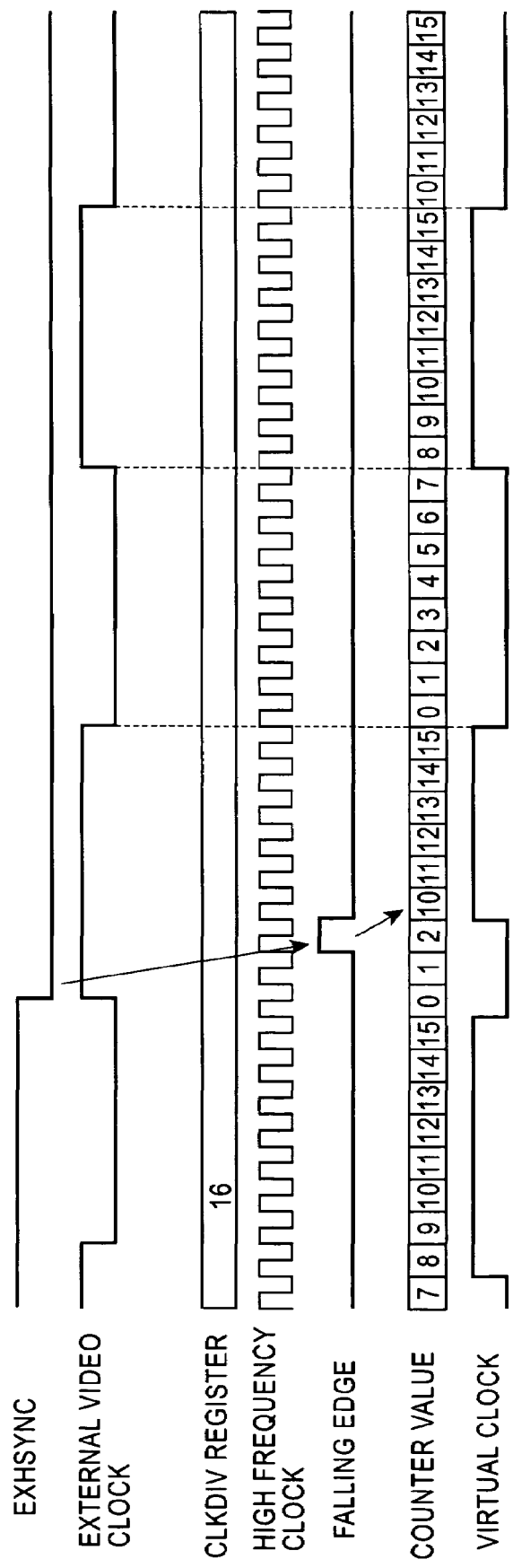
FIG. 4 is a timing chart (2) representing the virtual clock generating operation in the first embodiment.

Next, the operation of generating the virtual clock INCLK will be described. FIG. 3 is a timing chart associated with the generation of the virtual clock INCLK when the frequency division ratio register 4 is loaded with "12," and FIG. 4 is a timing chart associated with the generation of the virtual clock INCLK when the frequency division ratio register 4 is loaded with "16."

When the frequency division ratio register 4 is loaded with the value "12," the counter 2 counts up a constant period (12 high frequency clock periods) in accordance with the value, and the virtual clock generator circuit 3 generates the virtual clock INCLK in accordance with the state of the value counted by the counter 2. For example, when the frequency division ratio register 4 is loaded with the value of "12," the counter 2 repeatedly counts up from "4" to "15," while the virtual clock generator circuit 3 outputs an "L" level as the virtual clock INCLK when the count value is between "4" and "9," and outputs an "H" level as the virtual clock INCLK when the count value is between "10" and "15." In this way, the frequency of the high frequency clock HFCLK is divided by 12 to generate the virtual clock INCLK.

Here, upon receipt of the detection signal EG indicating the detection of a falling edge of the external horizontal synchronization signal EXHSYNC, the counter 2 is loaded with a count value such that the phase matches with the external video clock which is in synchronism with the external horizontal synchronization signal EXHSYNC. Since the phase relationship between the external horizontal synchronization signal EXHSYNC and the external video clock, and the time relationship until an edge signal is generated from a falling edge of the external horizontal synchronization signal EXHSYNC and loaded into the counter 2 are constant, the counter 2 is loaded with a value calculated with the set value "12" in the frequency division ratio register 4. With the set value "12," when the counter 2 is loaded with the value of "12" in response to the falling edge detection signal EG, the subsequent virtual clock INCLK matches the external video clock in phase, as shown in FIG. 3.

Since differential processing is performed using input/output data of the D-flip-flop 8 after the external horizontal synchronization signal EXHSYNC is synchronized to the high frequency clock HFCLK by the D-flip-flop 7, the effective edge (falling edge) of the falling edge detection signal EG is delayed from the rising edge of the external video clock by one to two high frequency clock periods. For this reason, the frequency division ratio register 4 is loaded with the value "12" which is larger by two than the minimum value "10" which defines the "H" level of the external video clock.

When the frequency division ratio register 4 is loaded, for example, with a value of "16," the counter 2 repeatedly counts up from "0" to "15," while the virtual clock generator circuit 4 outputs an "L" level as the virtual clock INCLK when the count value is between "0" and "7" and outputs an "H" level as the virtual clock INCLK when the count value is between "8" and "15," as shown in FIG. 4. In this way, the frequency of the high frequency clock HFCLK is divided by 16 to generate the virtual clock INCLK. The counter 2 is loaded with a value "10" (=8+2) calculated from the set value "16" in response to the edge detection signal EG.

As shown in FIGS. 3 and 4, when the "H" level period of the virtual clock INCLK is shorter immediately after the detection of a falling edge of the external horizontal synchronization signal EXHSYNC, and the video processing circuit 21 operates with the falling edge of the video clock as an effective edge, the period from the preceding falling edge is so short that the video processing circuit 21 can malfunction.

For this reason, as described above, the toggle output clock TCLK is selected as the dot clock DCLK instead of the virtual clock INCLK in a certain period immediately after a falling edge of the external horizontal synchronization signal EXHSYNC has been detected.

Next, a switching from the virtual clock INCLK to the toggle output clock TCLK, and a switching from the toggle output clock TCLK to the virtual clock INCLK will be described with reference to timing charts.

Upon detection of a falling edge of the external horizontal synchronization signal EXHSYNC, the selection of the dot clock DCLK is switched from the virtual clock INCLK to the toggle output clock TCLK, and after the virtual clock INCLK is synchronized with the external video clock, the selection of the dot clock DCLK is switched from the toggle output clock TCLK to the virtual clock INCLK.

For switching from the virtual clock INCLK to the toggle output clock TCLK upon detection of a falling edge of the external horizontal synchronization signal EXHSYNC, the toggle generator circuit 5 adjusts the phase of the toggle output clock TCLK.

Figure 5:
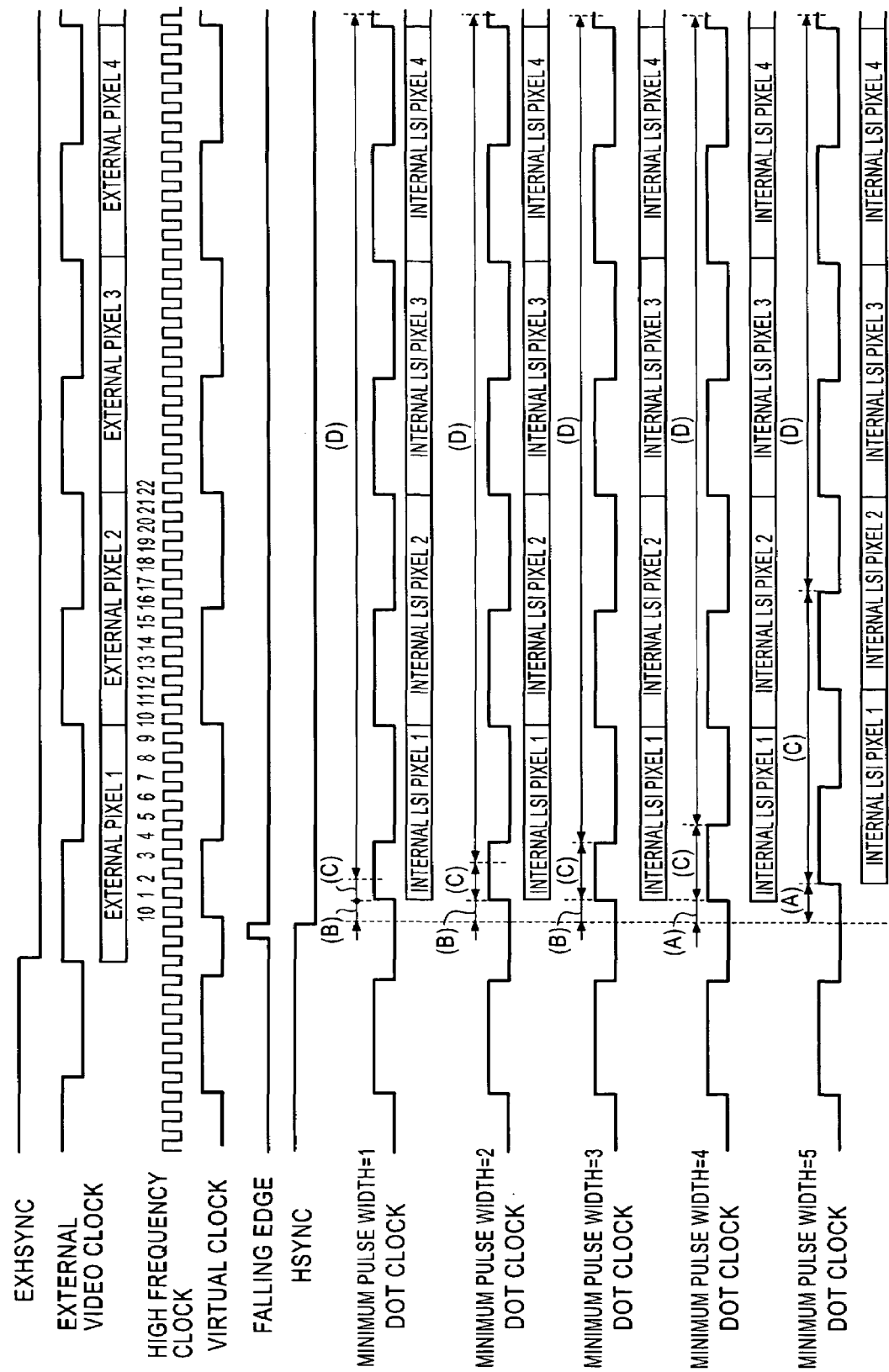
FIG. 5 is a timing chart (1) representing a dot clock generating operation in the first embodiment.
Figure 6:
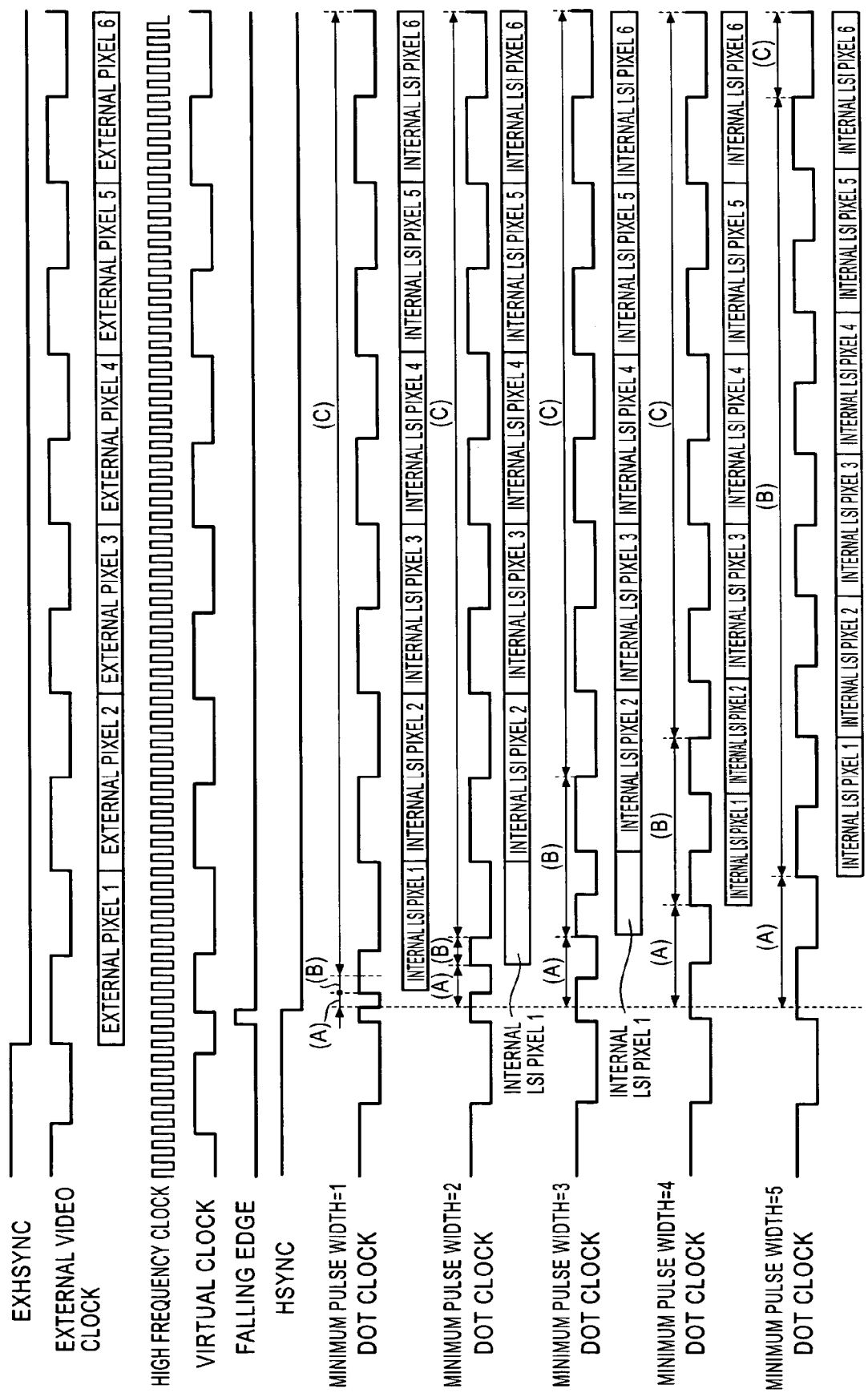
FIG. 6 is a timing chart (2) representing the dot clock generating operation in the first embodiment.

The adjustment of the phase of the toggle output clock TCLK depends on whether the logical level of the dot clock DCLK is "H" or "L" at a timing at which a falling edge of the external horizontal synchronization signal EXHSYNC is generated. In the following, the operation will be described separately when the dot clock DCLK is at "L" and at "H" upon generation of a falling edge of the external horizontal synchronization signal EXHSYNC. FIG. 5 is a timing chart for the former case, and FIG. 6 is a timing chart for the latter case. In FIGS. 5 and 6, the frequency division ratio register 4 is loaded with the set value "12." When the frequency division ratio register 4 is loaded with "12," one of "1," "2," "3," "4," and "5" can be set in the minimum pulse width register 6. FIGS. 5 and 6 describe the operation when any of these values is set in the minimum pulse width register 6.

(1) When Dot Clock is at "L" Upon Generation of Falling Edge

When the dot clock DCLK is at "L" level at a timing at which the detection signal EG falls, it is necessary to know how many cycles (one cycle is equal to one high frequency clock period) the "L" level period has passed. This number of cycles can be known from the value of the counter 2.

The toggle generator circuit 5 determines from the value of the counter 2 how many cycles "L" must be additionally generated, and extends the "L" period to satisfy the minimum pulse width (period (A) in FIG. 5).

Even if the "L" period has been output to satisfy the minimum pulse width, the "H" level is output with a delay of one extra cycle in order to ensure a set-up time for the horizontal synchronization signal HSYNC for a rising edge of the dot clock DCLK (period (B) in FIG. 5).

Subsequently, the toggle generator circuit 5 outputs the "H" period by the minimum pulse width. At the time the "H" period of the minimum pulse width ends, the switching determining circuit 13 determines from the value of the counter 2 whether or not a selection of the toggle output clock TCLK should be terminated. The determination is based on whether or not a timing at which the "L" period has been output by another minimum pulse width in future is in time for the next rising of the virtual clock INCLK (same as or before the rising timing). This can be known from the values of the two clock number counters 10, 11. The switching determining circuit 13 indicates that the value of the counter 2 at the time the toggle generator circuit 5 would have output the "L" period by the minimum pulse width (determined from the value of the counter 2 and the minimum pulse width at the time of the determination) is before a count value corresponding to the start of outputting the next virtual clock INCLK at "H" level (determined by the value of the counter 2 and the contents set in the frequency division ratio register 4 at the time of the determination), and determines that the timing is in time when the count values of the two clock number counters 10, 11 are the same, and otherwise determines that the timing is not in time.

Upon determining that the timing is in time, the switching determining circuit 13 switches the output of the dot clock DCLK to the virtual clock INCLK at that time, followed by termination of the clock selection control.

On the other hand, upon determining that the timing is not in time, the switching determining circuit 13 monitors the toggle output clock TCLK after the time of the determination, and makes a similar determination to the foregoing at the time one period (an "L" period of the minimum pulse width and an "H" period of the minimum pulse width) has elapsed.

Similar determination processing is repeated (for a period (C) in FIG. 5) until the result of the determination declares that the supposed output end timing of the "L" period is in time for the next rising edge of the virtual clock INCLK. After determining that the output end timing is in time, the switching determining circuit 13 outputs the virtual clock INCLK as the dot clock (for a period (D) in FIG. 5).

The toggle output clock TCLK is selected as the dot clock DCLK from a timing t0 of the edge selection signal EG.

When "1" is set for the minimum pulse width, an "L" period of the minimum pulse width is ensured at the timing t0 of the edge detection signal EG, and from this time t0, an "L" period for ensuring a set-up is ensured for one cycle by the toggle generator circuit 5. From a time t0+1 after ensuring one cycle (here "1" represents one cycle period, which is also applied in the following description), an "H" period of the minimum pulse width continues, and at a time t0+2 at which the "H" period expires, the switching determining circuit 13 determines the clock selection. Supposing that the "L" period of the minimum pulse period continues in the "H" period, the end timing would be at t0+3. Since the output end timing is in time by the next rising timing t0+10 of the virtual clock INCLK, the dot clock DCLK is switched to the virtual clock INCLK at this time of determination t0+2.

When "5" is set for the minimum pulse width, two cycles are short with respect to the "L" period of the minimum pulse width at the timing t0 of the edge detection signal EG, so that the "L" period is ensured for two cycles from the timing t0 of the edge detection signal EG by the toggle generator circuit 5. From the time t0+2 after ensuring the extra "L" period, an "H" period continues over the minimum pulse width. At a time t0+7 at which the "H" period ends, the switching determining circuit 13 determines the clock selection. Supposing that the "L" period of the minimum pulse width continues in this "H" period, the end timing is at t0+12, and the this end timing is not in time for the next rising timing to+10 of the virtual clock INCLK, so that the switching determining circuit 13 again makes a determination at a time t0+17 at which the "H" period ends after one period of the toggle output clock TCLK from this determination time t0+7. Supposing that the "L" period continues for the minimum pulse width from this time t0+17, the end timing is at t0+22, and therefore the end timing is in time for the next rising timing t0+22 of the virtual clock INCLK, so that the dot clock DCLK is switched to the virtual clock INCLK at this determination time t0+1.

While description is omitted for the case where "2," "3," "4" are set for the minimum pulse width, the operation is as shown in FIG. 5.

(2) When Dot Clock is at "H" Upon Generation of Falling Edge

When the dot clock DCLK is at "H" level at a timing at which the detection signal EG falls, it is necessary to know how many cycles the "H" level period has passed. This number of cycles can be known from the value of the counter 2.

The toggle generator circuit 5 determines from the value of the counter 2 how many cycles "H" must be additionally generated (the "H" cycle may not be extended in some cases), extends the "H" period to satisfy the minimum pulse width (the "H" period may not be extended as the case may be), and further outputs an "L" period of the minimum pulse width in succession (period (A) in FIG. 5). While FIG. 6 shows the case where the minimum pulse width is "1" and "2," the operation is similar when the minimum pulse width takes other values.

The subsequent operation is similar to the aforementioned operation when the dot clock DCLK is at "L" level upon the generation of the falling edge.

Specifically, the toggle generator circuit 5 outputs the "H" period only by the minimum pulse width, and at the time the "H" period ends, the switching determining circuit 13 determines at this time from the value of the counter 2 or the like whether or not the replacement with the toggle output clock TCLK is terminated (executing a switching to the virtual clock INCLK) in a manner similar to the foregoing case.

In the period (B) in FIG. 6, the toggle output clock TCLK is selected after an adjustment of the initial phase of the toggle output clock TCLK, and in the period (C) in FIG. 6, the virtual clock INCLK is selected.

(A-3) Advantage of First Embodiment

According to the first embodiment, the output video clock and dot clock can be adjusted in phase while ensuring the minimum pulse width, and the number of dot clocks on one horizontal scanning line can be chosen to be a predetermined number. As a result, it is possible to suppress the introduction of hazard to a device which receives the supply of the dot clock, thus contributing to a more stable operation of a system.

(B) Second Embodiment

Figure 7:
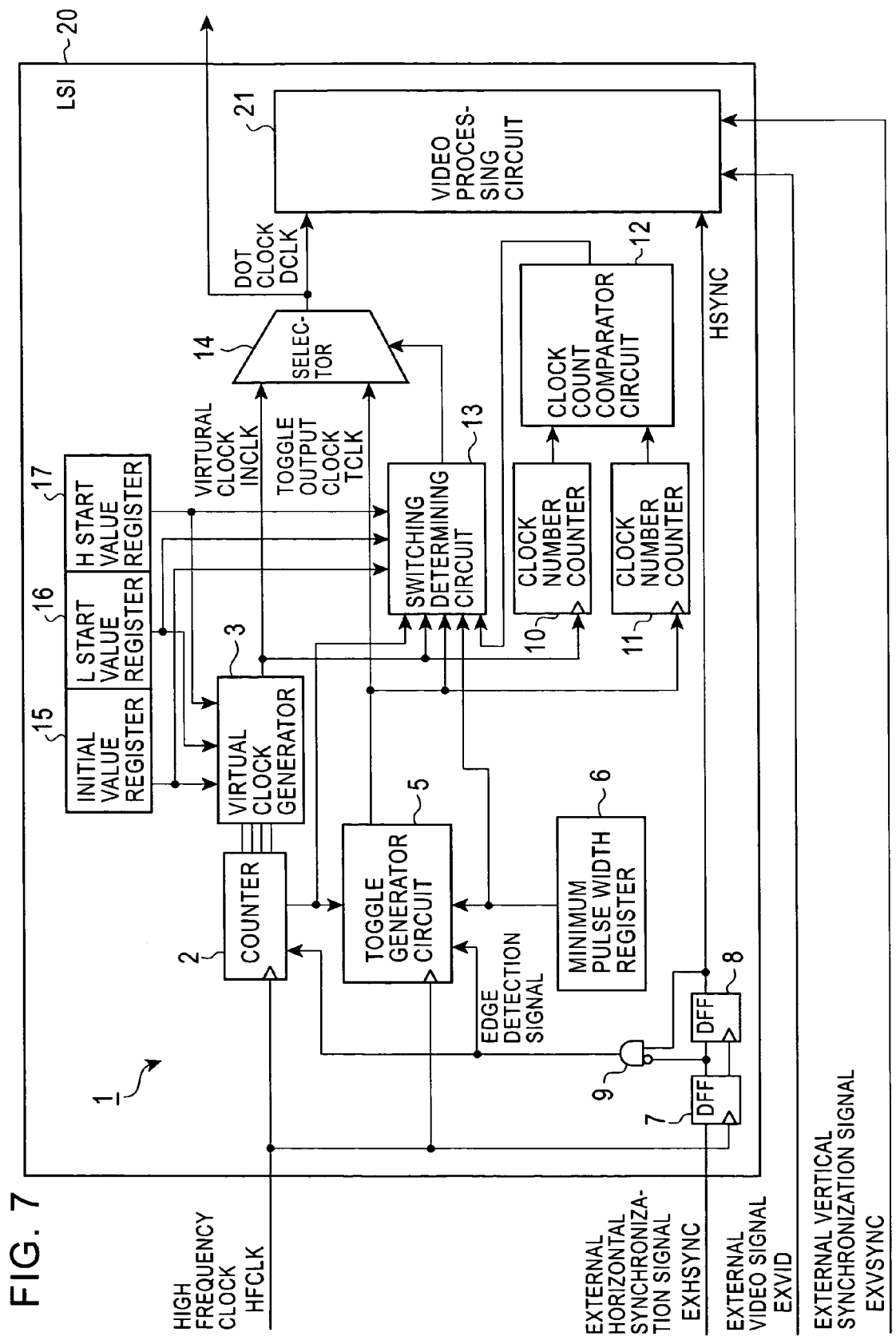
FIG. 7 is a block diagram illustrating the configuration of a dot clock synchronization generator circuit according to a second embodiment.

Next, a dot clock synchronization generator circuit according to a second embodiment of the present invention will be described in detail with reference to the drawings. FIG. 7 is a block diagram showing the configuration of the dot clock synchronization generator circuit according to the second embodiment, where identical or corresponding parts to those in the first embodiment shown in FIG. 1 are designated the same reference numerals.

In the first embodiment, on the assumption that a significant edge (falling edge) of the external horizontal synchronization signal EXHSYNC matches a rising edge of the external video clock, the number of periods (number of cycles) in the high speed clock HFCLK is set as frequency division ratio information.

The second embodiment comprises a group of registers which correspond an arbitrary timing relationship between the external horizontal synchronization signal EXHSYNC and the external video clock, and the frequency of the high speed clock HFCLK is divided in accordance with the contents set in these registers. Specifically, the frequency division ratio register 4 in the first embodiment is replaced with an initial value register 15, an L start value register 16, and an H start value register 17.

The initial value register 15 holds an initial value for the counter 2 externally set therein. Specifically, when the counter 2 receives the value of the counter 2 at the time the "L" period of the virtual clock INCLK starts from the outside, the value of the initial value register 15 is loaded to the counter 2.

The L start value register 16 holds the value of the counter 2 externally set therein at the start of an "L" period of the virtual clock INCLK.

The H start value register 17 holds the value of the counter 2 externally set therein at the start of an "H" period of the virtual clock INCLK.

In the second embodiment, the operation for adjusting the phase of the dot clock DCLK is basically similar to the first embodiment, but differs from the first embodiment in that the waveform of the virtual clock INCLK (and therefore the dot clock DCLK) can be freely set by setting the resisters.

When the value of the counter 2 reaches a maximum value, the virtual clock generator circuit 3 changes the level of the virtual clock INCLK to "L" in the next cycle. Here, assuming that the counter 2 counts up from "1" to "16" (the counter 2 may count from 0 to 15), the virtual clock generator circuit 3 changes the level of the virtual clock INCLK to "L" in the next cycle when the value of the counter 2 reaches "16."

By selecting a set value for the initial value register 15, it is possible to shift the timing of the virtual clock INCLK (and therefore the dot clock DCLK). By selecting a set value in the L start value register 16, the frequency division ratio can be changed. Specifically, a period from a set value of the L start value register 16 to a maximum value (for example, "16") of the counter 2 is defined to be one period of the virtual clock INCLK (and therefore the dot clock DCLK). By selecting a set value for the H start value register 17, it is possible to change the duty ratio of the virtual clock (and therefore, the dot clock DCLK).

While the determination made by the switching determining circuit 13 is similar to that in the first embodiment, the switching determining circuit 13 is applied with set values held in the initial value register 15, L start value register 16, and H start value register 17 in order to capture the timing of the virtual clock INCLK.

Though description is omitted, FIGS. 8 to 11 are timing charts showing examples of the virtual clock INCLK and dot clock DCLK according to the second embodiment, and correspond to the timing charts shown in FIGS. 5 and 6, respectively, according to the first embodiment.

Figure 8:
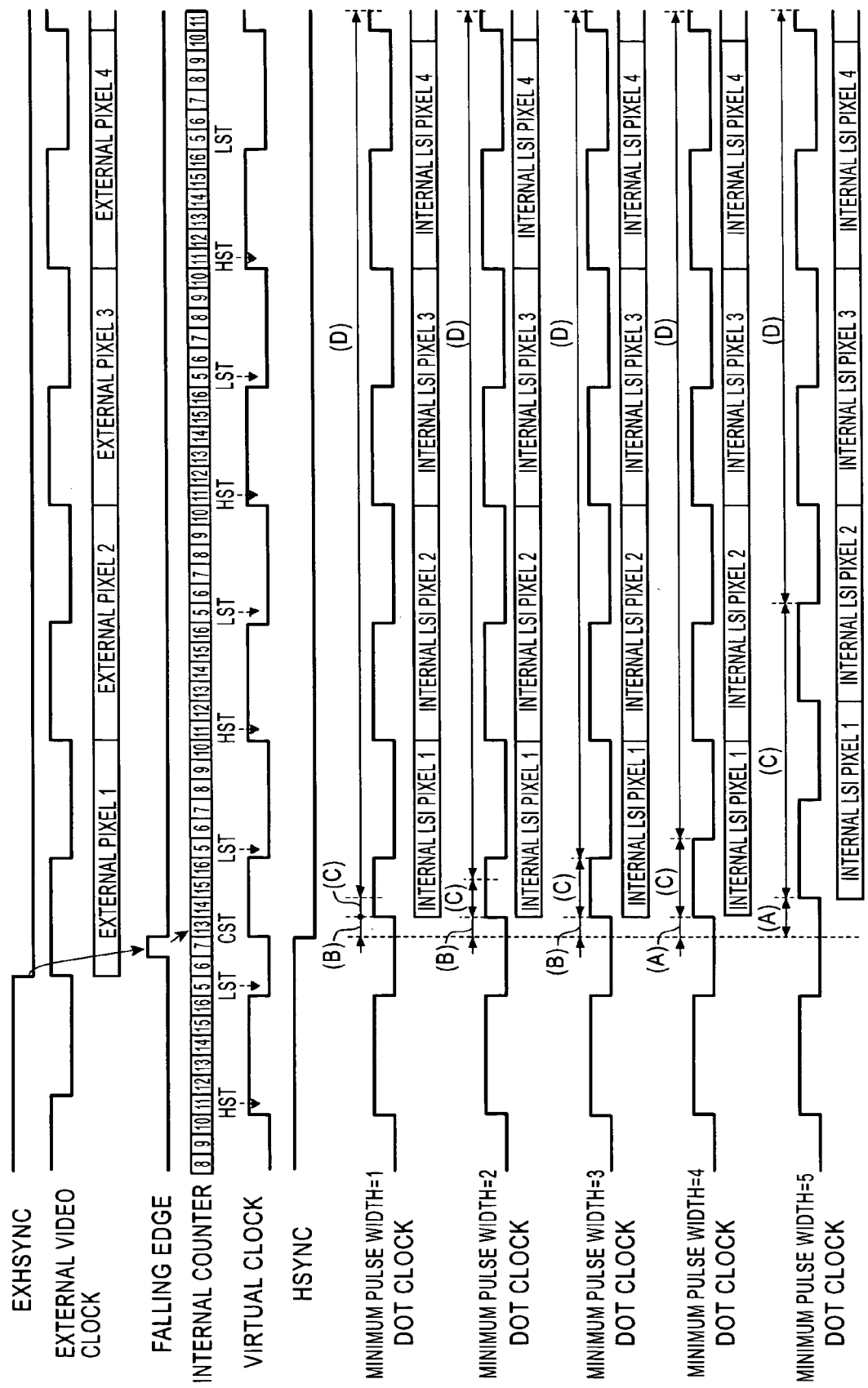
FIG. 8 is a timing chart (1) representing a dot clock generating operation in the second embodiment.
Figure 9:
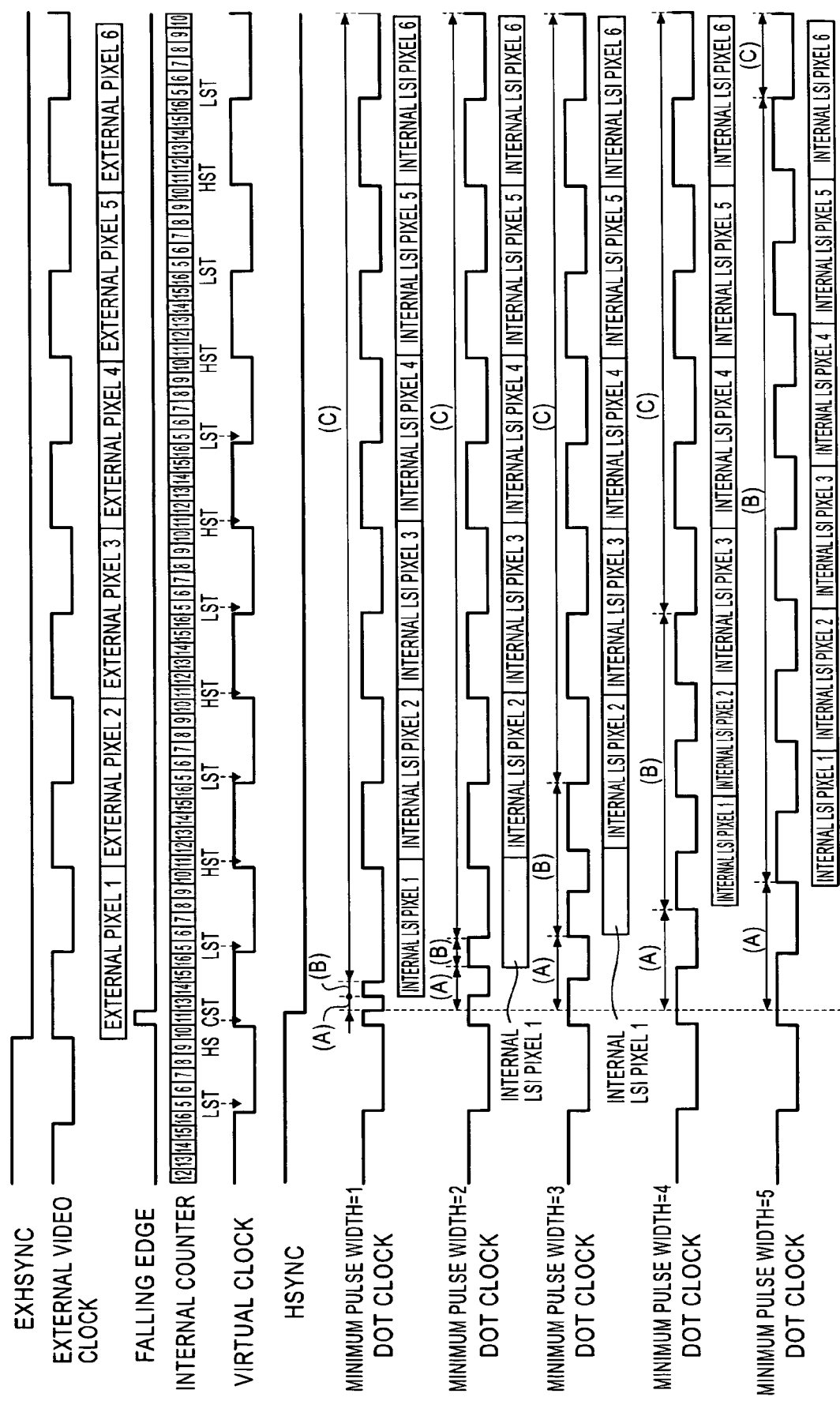
FIG. 9 is a timing chart (2) representing the dot clock generating operation in the second embodiment.

FIGS. 8 and 9 show the case where a rising edge of the external video clock matches the falling edge of the external horizontal synchronization signal EXHSYNC in timing, where FIG. 8 shows the case where the dot clock DCLK is at "L" at a timing of the edge detection signal EG, while FIG. 9 shows the case where the dot clock DCLK is at "L" at a timing of the edge detection signal EG.

Figure 10:
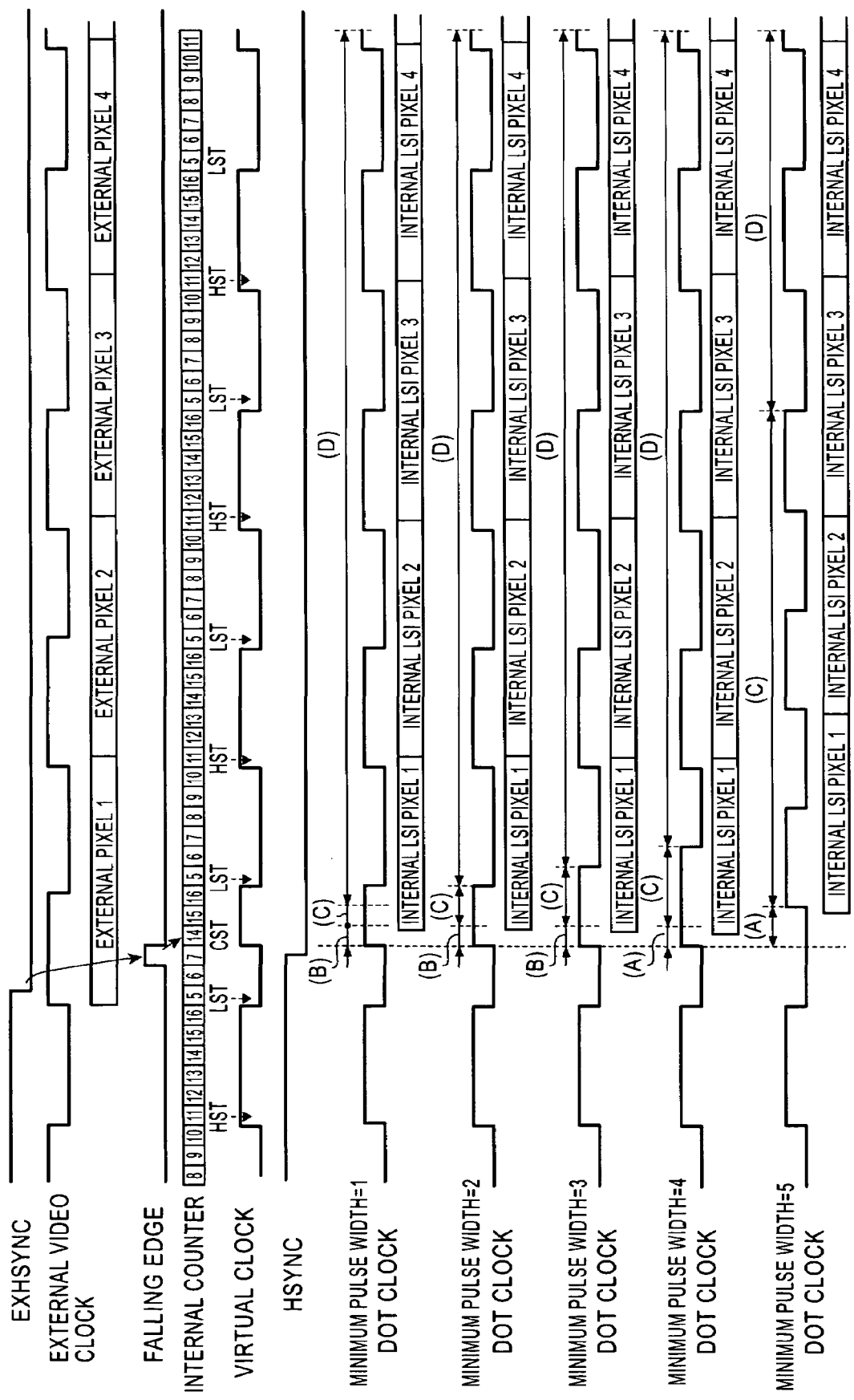
FIG. 10 is a timing chart (3) representing the dot clock generating operation in the second embodiment.
Figure 11:
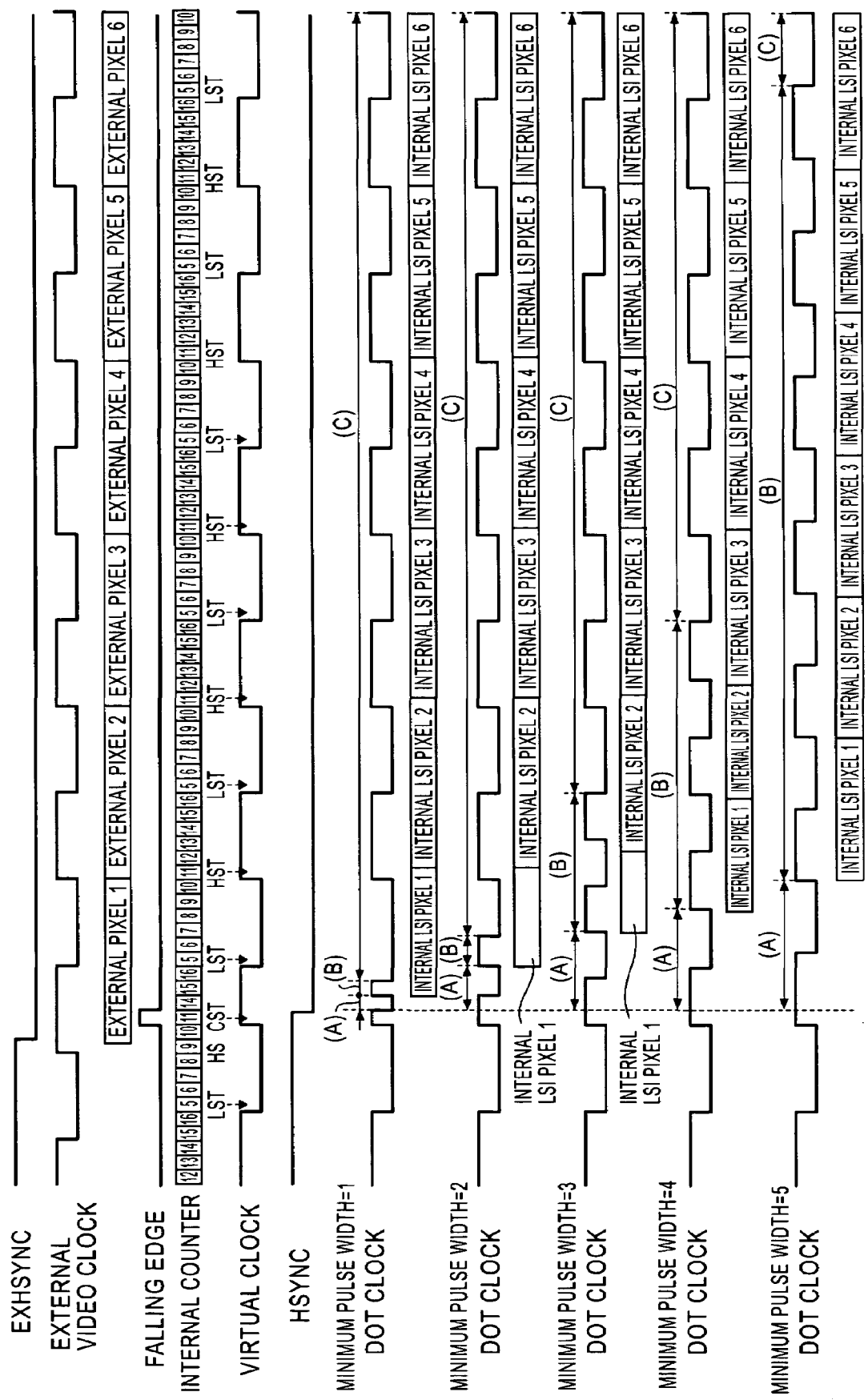
FIG. 11 is a timing chart (4) representing the dot clock generating operation in the second embodiment.

FIGS. 10 and 11 show the case where the rising edge of the external video clock is earlier by one cycle (one cycle of the high frequency clock) than the falling edge of the external horizontal synchronization signal EXHSYNC, where FIG. 10 shows the case where the dot clock DCLK is at "L" at a timing of the edge detection signal EG, while FIG. 11 shows the case where the dot clock DCLK is at "L" at a timing of the edge detection signal EG.

In the scenarios show in FIGS. 8 and 9, the initial value register 15, L start value register 16, and H start value register 17 are set to "13," "5," "11," respectively, to synchronize the external video clock with the dot clock DCLK, whereas in the scenarios shown in FIGS. 10 and 11, the initial value register 15, L start value register 16, and H start value register 17 are set to "14," "5," "11," respectively, to synchronize the external video clock with the dot clock DCLK.

Likewise, in the second embodiment, after detecting a falling edge of the external horizontal synchronization signal EXHSYNC, a toggle output clock TCLK of a minimum pulse width set in the minimum pulse width register 6 is output as the dot clock DCLK, and afterwards, the dot clock DCLK is switched to the virtual clock INCLK which is output as the dot clock DCLK.

Even when the registers are set to establish a temporal relationship such that there is a predetermined phase difference (other than zero) between the external horizontal synchronization signal EXHSYNC and the external video clock, it is necessary that the relationship between the external video clock and the external video signal (the count of the number of pixels) and the relationship between the horizontal synchronization signal HSYNC and the dot clock DCLK within the LSI 20 do not change (the same count of the number of pixels). Specifically, while the phase of the dot clock DCLK can be shifted by varying the set value for the initial value register 15 (see comparisons between FIGS. 8 and 9, and between FIGS. 10 and 11), it is necessary to set in the toggle generator circuit 15 or switching determining circuit 13 to which of the external video signal is recognized as a first pixel for a falling edge of the external horizontal synchronization signal EXHSYNC. Such a setting can be made by a method of fixing within the circuit, a method of providing a separate register, and the like, and is arbitrary. The examples in FIGS. 8 to 11 correspond to the case which is applied with a fixing method that recognizes that a period until the value of the counter 2 reaches "16" after a falling edge is recognized to be the first pixel of the external video signal.

With the setting of the initial value register 15, the phase cannot be adjusted beyond one period of the dot clock DCLK. This is because phase adjustment exceeding one period would cause a set value in the register to become the same value as that before the phase is shifted.

Taking into account the convenience of using the dot clock phase adjusting function in an actual system, even if the dot clock is shifted to the front or to the rear by one-half period by the setting of the initial value register 15, it is preferable to be able to adjust the phase with the external video clock.

According to the second embodiment, the following advantages can be provided in addition to similar advantages of the first embodiment. According to the second embodiment, the waveform of the dot clock can be set freely. As a result, for example, in an inter-device interface on an actual system, a subtle timing adjustment can be made by the phase adjusting function of the second embodiment when a wiring capacitance, a delay, and the like must be taken into account, thereby more smoothly building a system.

(C) Other Embodiments

While the embodiments described above have shown the dot clock synchronization generator circuit which is contained in the same LSI together with the video processing circuit, the dot clock synchronization generator circuit alone may be contained in an LSI. Also, all or some of the components of the dot clock synchronization generator circuit may be implemented by discrete parts external to the LSI.

The effective edge, logical levels and the like of the dot clock may be reverse to those in the respective embodiments described above.

Further, while the foregoing embodiments have been described with the intention that a video signal conforms to a non-interlace system, the present invention can be applied to a video signal conforming to an interlace system as well.

Furthermore, while the foregoing embodiments have shown registers, to which values can be variably set, fixed registers, to which values cannot be variably set, may also be employed.

While the foregoing embodiments have shown the dot clock, one period of which corresponds to one pixel, one period of the dot cycle may correspond to one-half pixel or to two pixels.

This application is based on Japanese Patent Application No. 2004-159736 which is herein incorporated by reference.

What is claimed is:

1. A dot clock synchronization generator circuit for generating a dot clock corresponding to each pixel on one horizontal scanning line based on a horizontal synchronization signal applied thereto, and a high frequency signal applied thereto having a frequency higher than the frequency of the dot clock to be generated, said dot clock synchronization generator circuit comprising:
   a frequency division ratio storing part for storing information on a frequency division ratio for diving the high frequency clock;
   a minimum allowable period information storing part for storing information on a minimum allowable period of each logical level period of the dot clock, defined by the number of cycles of the high frequency clock;
   an edge detecting part for detecting a significant edge of the horizontal synchronization signal;
   a first dot clock forming part for dividing the high frequency clock to form a first dot clock in accordance with the information on the frequency division ratio stored in said frequency division ratio storing part, and for initializing the phase of the first dot clock in accordance with the information on the frequency division ratio stored in said frequency division ratio storing part upon detection of the significant edge of the horizontal synchronization signal;
   a second dot clock forming part for forming a second dot clock from the high frequency clock in accordance with the information on the minimum allowable period stored in said minimum allowable period information storing part, said second dot clock changing a logical level every minimum allowable period, and for modifying the phase of the second dot clock upon detection of the significant edge of said horizontal synchronization signal such that the minimum allowable period of the logical level period is ensured even before and after the detection of the significant edge;
   a selecting part for selecting one of the first and second dot clocks as a dot clock to be output; and
   a selection control part for forcing said selecting part to select the second dot clock from said second dot clock forming part upon detection of the significant edge of the horizontal synchronization signal, and for forcing said selecting part to select the first dot clock from said first dot clock forming part when a confirmation can be made that the timing of the significant edge of the first dot clock is coincident with or behind the timing of the significant edge of the second dot clock.

2. A dot clock synchronization generator circuit according to claim 1, wherein said all parts are formed on the same semiconductor chip.

3. A dot clock synchronization generator circuit according to claim 1, wherein said frequency division ratio information storing part is capable of variably setting the information on the frequency division ratio.

4. A dot clock synchronization generator circuit according to claim 2, wherein said frequency division ratio information storing part is capable of variably setting the information on the frequency division ratio.

5. A dot clock synchronization generator circuit according to claim 1, wherein said minimum allowable period storing part is capable of variably setting the information on the minimum allowable period.

6. A dot clock synchronization generator circuit according to claim 2, wherein said minimum allowable period storing part is capable of variably setting the information on the minimum allowable period.

7. A dot clock synchronization generator circuit according to claim 3, wherein said minimum allowable period storing part is capable of variably setting the information on the minimum allowable period.

8. A dot clock synchronization generator circuit according to claim 4, wherein said minimum allowable period storing part is capable of variably setting the information on the minimum allowable period.

9. A dot clock synchronization generator circuit according to any of claims 1-8, wherein said frequency division ratio storing part stores the number of cycles of the high frequency clock equivalent to one period of the dot clock, as the frequency division ratio information.

10. A dot clock synchronization generator circuit according to any of claims 1-8, wherein said frequency division ratio information storing part stores timing information for starting each logical level period of the first dot clock, and timing information for initializing as the phase of the first dot clock upon detection of the significant edge of the horizontal synchronization signal as the frequency division ratio information.

* * * * *